July 26, 1960  J. B. KRAELING  2,946,632
CRANE WHEELS

Filed Dec. 13, 1955  4 Sheets-Sheet 1

INVENTOR.
JOHN B. KRAELING
BY
*William D Carothers*
HIS ATTORNEY

July 26, 1960     J. B. KRAELING     2,946,632
CRANE WHEELS

Filed Dec. 13, 1955     4 Sheets-Sheet 4

INVENTOR.
JOHN B. KRAELING
BY William D. Carothers
HIS ATTORNEY

United States Patent Office 2,946,632
Patented July 26, 1960

2,946,632

CRANE WHEELS

John B. Kraeling, Glenshaw, Pa., assignor to Drafto Corporation, Cochranton, Pa., a corporation of Pennsylvania Filed Dec. 13, 1955, Ser. No. 552,801

16 Claims. (Cl. 308—190)

This invention relates generally to wheel mountings for cranes, charging machines, soaking pit cover carriages and the like and more particularly to the bearing and wheel arrangements in said mountings.

The principal object of this invention is the provision of a self-contained bearing assembly within the wheel that balances the forces between a stationary axle and the wheel. This novel structure overcomes the difficulties in this type of wheel mounting by solving the problems of misaligned bearings and by providing the choice of adequate bearings and the location of load transference between the rotary and stationary members which are in vertical and triangular alignment. This structure eliminates the problems of wear and misalignment of bearings that are offset from the load application to the wheels.

Another object is the provision of a wheel assembly on a bearing structure carried by a stationary shaft wherein the wheel is fixed in proper radial load distribution to the bearings and the wheels are locked on the bearing structure by three modes, namely, interference fit, key and by bolts.

Another object is the provision of a coaxially concentrically mounted shaft member and a bearing housing member having cooperating shoulders for receiving antifrictional bearings located in a predetermined position to balance the load transmission and distribution from this shaft member to the wheel. The shoulders in these members may be positioned intermediate of the antifrictional bearings requiring the bearings to be mounted from both ends of the members or the shoulder may be positioned at one end of each member requiring the bearings to be mounted from one end of said members.

Another object of this invention is the provision of a pair of conical antifriction roller bearings of equal size and of opposite slope mounted in the triangular relation relative to the wheel they support for uniform transference of the load between the shaft and the wheel.

Another object is the provision of a bearing structure for crane wheels and the like in which the clearance in the bearings may be obtained by either the use of shims or a locked nut adjustment.

Another object is the provision of the unitary key for locking the wheel and gear element or blank element on the bearing housing which key elements supplement the retention of the wheel and the gear on the housing by an interference fit which may be defined as either a press or shrink fit together with an additional lock which holds the wheel and gear member and the bearings in their operating position.

Another object is the provision of a series of bolts for locking the wheel and gear elements on the gear housing and against the shoulder on the perimetral surface of the housing.

Other objects and advantages appear hereinafter in the following description of claims.

The accompanying drawings show for the purpose of exemplification without limiting the invention or claims thereto, certain practical embodiments illustrating the principles of this invention wherein:

Figure 1:
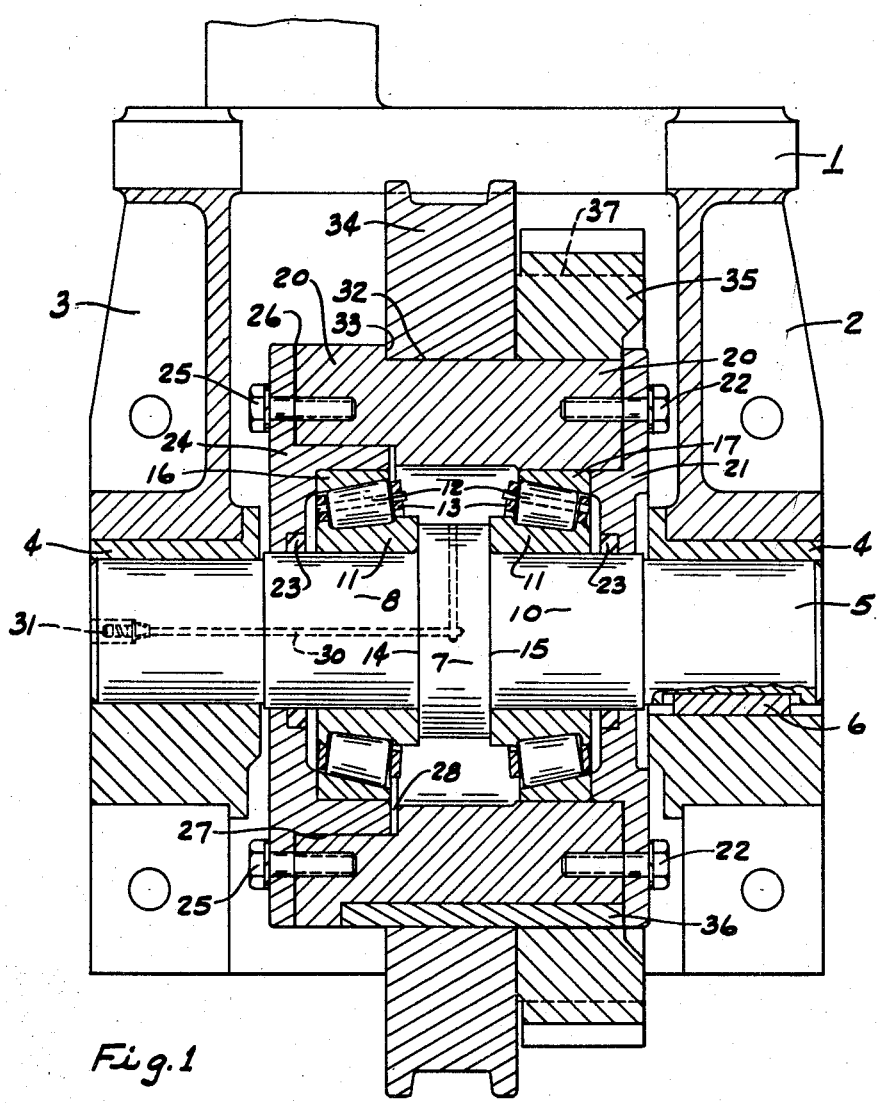
Fig. 1 is a sectional view of the floor charger wheel and its bearing support.

Referring specifically to Fig. 1, the floor charger is provided with the carriage 1 comprising spaced brackets 2 and 3 which receive the bearing pads 4 that contain the ends of the shaft 5. One of the pads 4 may be keyed to the end of the shaft 5 by the key illustrated at 6. Thus the shaft 5 is held stationary relative to the carriage.

The shaft 5 is provided with a central flange 7 that presents bearing surfaces 8 and 10 for receiving the cones 11 of the conical antifriction roller bearings 12. Each bearing is provided with a cage member 13. The cones 11 of these bearings abut against the shoulders 14 and 15 of the flange 7 of the shaft and these cones have an interference fit with their respective sections 8 and 10 of the shaft 5. The intereference fit may be either a pressed fit or shrink fit. The term interference being intended to define either form of attaching the cones 11 to the respective sides 8 and 10 of the shaft 5.

The opposite race of each bearing is defined by the cup members or outer race 16 and 17. The cup member 17 likewise has an interference fit in the bore of the bearing housing 20. This cup or outer race is held in place by the bearing retainer plate 21 which is bolted to the bearing housing 20 by means of a series of bolts 22. The bearing retainer plate 21 is provided with a clearance for the shaft 5 and carries an oil seal 23 which will not retain the lubricant under pressure but permits the excess to bleed out of the housing and thus prevent entry of dirt. When the shaft and bearings are assembled the shoulder 15 is effective against the cone 11 and the cup 17 to hold the latter in engagement with the plate 21.

The cup 16 has an interference fit in the bore of the bearing carrier 24 which is likewise bolted to the bearing housing 20 by means of the bolts 25. Annular shims such as illustrated at 26 are placed between the bearing carrier 24 in the end bearing housing 20 for the purpose of providing the proper clearance for the conical bearings 12. The force being from the cup 16 on its seat through the first cone thence to the shoulder 14 of the flange 7 and from the shoulder 15 through the bearing cone to the cup 17 thence to the bearing retainer 21. Thus the shims 26 may be employed to maintain the running clearance on these conical bearings. The bearing carrier 24 having an interference fit between its bore and the cup 16 will have a slight interference fit in the bore 27 of the bearing housing and adequate clearance is provided at 28 to prevent the bearing carrier 24 from abutting the shoulder within the bearing housing. The bearing carrier 24 is likewise provided with an oil seal 23 and has clearance with section 8 of the shaft 5.

The bearing plates 21 and 24 constitute the opposed thrust transmitting means for the transmission of thrust on one member, such as the housing member 20. The shoulders 14 and 15 represent the second pair of thrust transmitting means on the other member, namely, the shaft 5, which shoulder means face outwardly.

The shaft 5 is bored as indicated at 30 the end of which is provided with a lubricating fixture 31 to supply lubricant to the chamber within the bearing housing enclosing the antifrictional bearings.

The outer surface of the bearing housing 20 is provided with a diameter 32 which forms a shoulder 33, The wheel member 34 and the gear or blank member 35 have an interference fit on the diameter 32 of the bearing housing. Aside from this interference fit the wheel member 34 and the gear or blank 35 are locked in place by the bearing retainer 21 the radial portion of which extends beyond the diameter 32. The wheel 34 and the blank or gear 35 is also keyed to the bearing housing 20 by the key member 36. Thus three forms of locking are provided to hold the wheel or the gear or blank on the bearing housing. This construction also permits the heat treatment of the wheel or the gear or blank member 35 independently of the bearing housing even though the wheel 34 and the gear or blank 35 are shrunk fit by heat on the bearing housing.

In the structure as shown in Fig. 1 the antifrictional bearings are the same, being the same size and diameter and the clearances are such as to position these antifrictional bearings in balanced triangular arrangement relative to the wheel 34 which is provided with a double flange. Any load on the axle 5 is unbalanced at the opposite ends of the axle when transmitted through the shaft 5 and the bearings provide a balanced load on the wheel. This corrective factor prevents wear of, not only the bearings but their associated parts and increases the life of the structure.

The gear or blank 35 is always a matter of choice. When a gear is needed to drive the wheel, the member 35 becomes the gear for this purpose. When such a gear is not needed to drive the wheel it is merely cut off at the dotted line 37 that is assembled in exactly the same manner. In the claims the gear or blank is called a blank.

Figure 2:
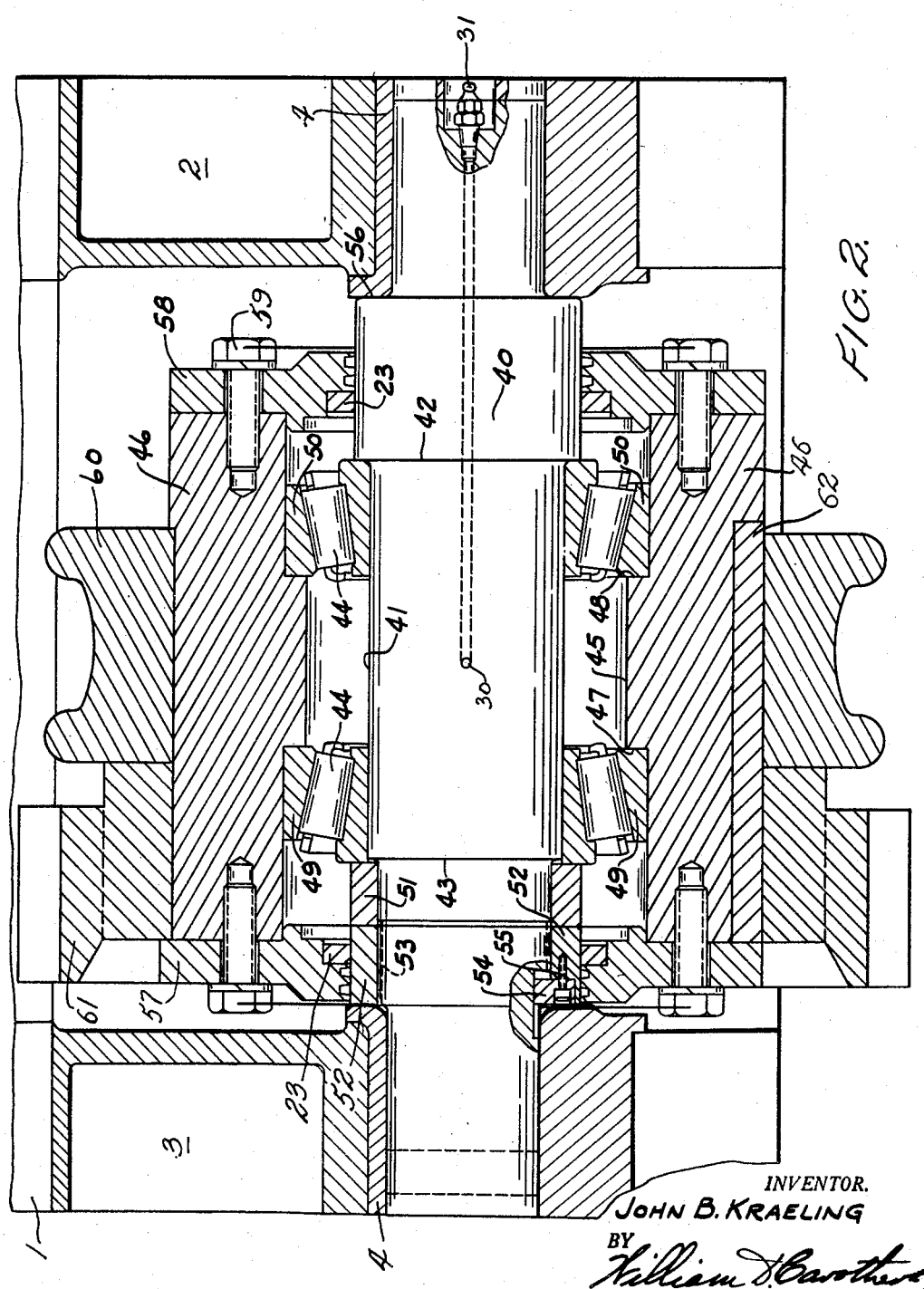
Fig. 2 is a sectional view of a soaking pit crane wheel illustrating another type of bearing arrangement.

Referring now to Fig. 2 it will be noted that the shaft 40 is not provided with a central flange but is provided with a single bearing surface 41 which terminates at the shoulder 42 larger in diameter at one end and the shoulder 43 defining a smaller diameter section at the other end. Here again the bearings 44 are the same and are replaceable with each other and are spaced apart by the internal flange 45 in the bearing housing 46 which presents the shoulders 47 and 48 against which the cup members 49 and 50 abut. It will be noted from the structure of Fig. 1 that the bearings slope outwardly; whereas from the structure in Fig. 2 the bearings are sloped in the opposite direction.

In assembling the bearing structure of Fig. 2 the cone member of the bearing 44 is provided with a loose fit on the diameter section of the shaft 41 and has abutted against the shoulder 42. The cup member 50 then abuts the shoulder 48 and the opposite shoulder 47 abuts the cup member 49 and the cone member of the opposite bearing is in this instance slidable on the section 41 of the shaft and is held by the filler ring 51 which is engaged by the bearing lock nut 52 which threadably engages the shaft as at 53 and is locked in place by the key member 54 held by the screw 55. The filler ring 51 together with the lock nut 52 having its threads 53 and the key 54 and the screw 55 all constitute a demountable thrust transmitting means on the shaft 40. This demountable thrust transmitting means together with the thrust transmitting means such as the shoulder 42 at the opposite end of the shaft constitute a pair of thrust transmitting means, on the shaft or one member, that oppose each other. The shoulders 47 and 48 represent the second pair of thrust transmitting means on the other member, namely, the bearing housing 46. A similar connotation will also apply to Figs. 3 and 4.

The bearing structure of Fig. 2 differs from the structure of Fig. 1 in that any lateral thrust between the bearing assembly and the support is received on the bearing lock nut 52 at one end and by the shoulder 56 at the other end. In the structure of Fig. 1 the thrust is received on the shoulders of the shaft and must be transmitted through the bearings; whereas in Fig. 2 the thrust on one side is transmitted directly to the bearing and not through the shaft as the bearing with the cup 49 is not locked on the shaft. The cone of the bearing 49 is not locked on the shaft as is the cone having the bearing cup 50. This is a novel structural arrangement for this bearing assembly.

The bearing housing 46 of Fig. 2 is provided with two closure rings 57 and 58 which are bolted to the housing by means of the bolts 59. These closure members do not function to lock either of the bearings and merely carry the oil seals 23 and provide the usual labyrinth grooves to prevent the ingress of dirt and foreign material. The closure ring 57 also locks the wheel 60 and the gear or blank 61 to the perimetral surface of the bearing housing 46 and is also provided with the key 62. Thus in this structure both the wheel and the gear or blank 61 having interference fit on the perimetral surface of the bearing housing 46 and are not only locked by the key 62 but also the plate 57.

Figure 3:
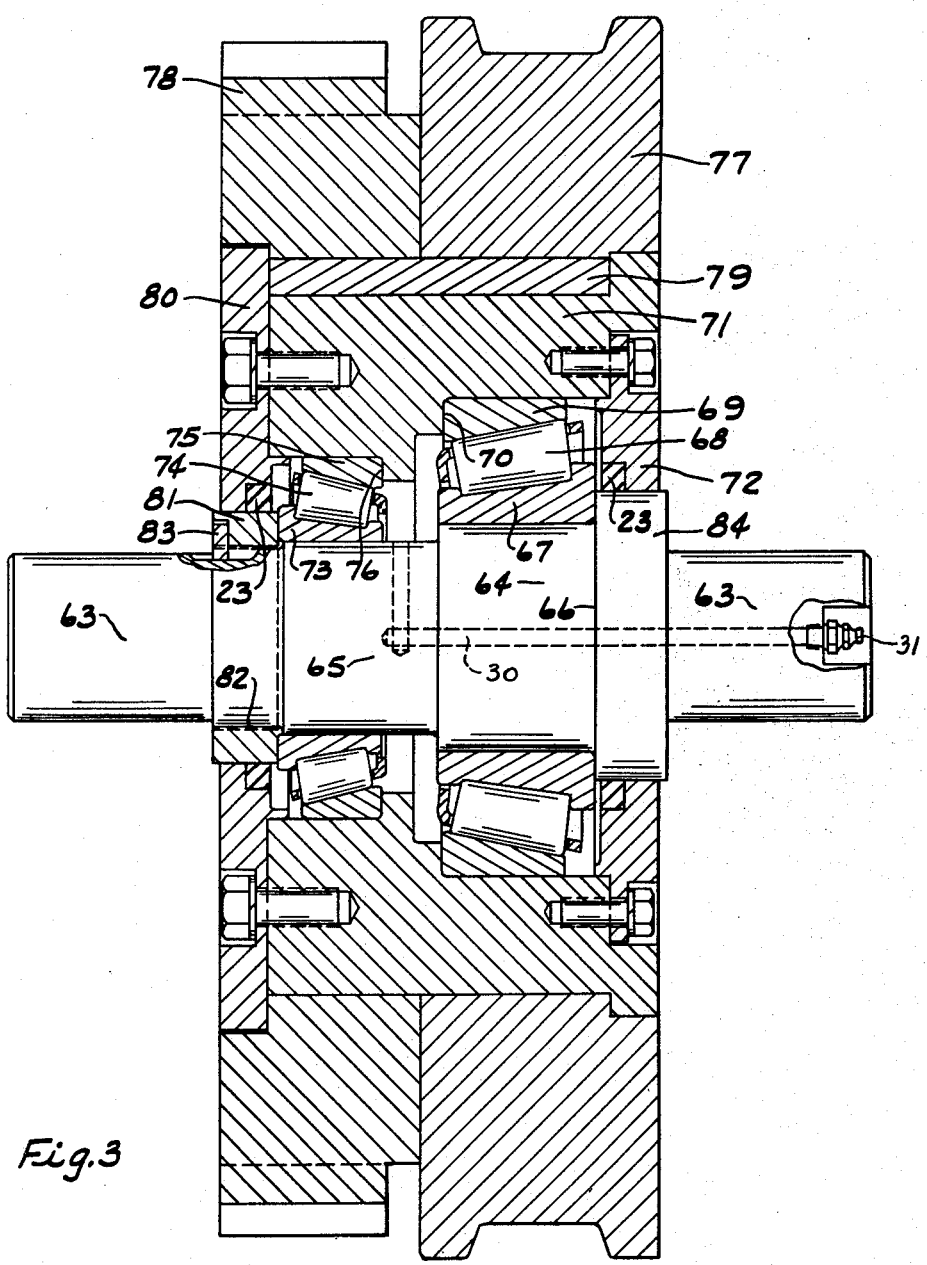
Fig. 3 is a sectional view of a crane wheel and bearing assembly therefor wherein a single large bearing supports the principal load.

In Fig. 3 the shaft 63 is provided with two diameters 64 and 65. The diameter 64 produces the shoulder 66 against which the cone 67 of the bearing 68 abuts. The outer race member or cup 69 engages the shoulder 70 in the bearing housing 71. This end of the bearing assembly is closed by the plate 72 which is bolted to the bearing housing and carries the oil seal 23.

The diameter 65 of the shaft has a sliding fit with the cone member 73 of the bearing 74, the race member 75 of which engages the shoulder 76 of the bearing housing 71. Here it will be noted that the two bearings 68 and 74 are sloped relative to each other in the same manner as Fig. 2. However the bearing 68 is the larger of the two and it is disposed directly under the wheel 77 and it carries substantially the whole of the load thereof with the smaller bearing 64 merely steadying the same and supporting any load which would be transmitted by the gear or block 78. The wheel 77 and the gear 78 having interference fit on the outer diameter of the bearing housing 71 and are retained by the key 79 and are also locked in place by the plate 80 which is bolted to the bearing housing 71 and carries the lubricant seal 23 with the usual labyrinth grooves. The shaft 63 also carries the bearing lock nut 81 which is threadably engaged on the shaft as indicated on 82 and which is locked to the shaft by the key 83. This bearing lock nut engages the cone 73 of the bearing 74 and its adjustment details the clearance of the bearings 68 and 74. Here again the cone 73 not being provided with an interference fit on the section 65 of the shaft 63 provides a structure wherein that lock nut 81 must receive the thrust and transmit it directly to the bearing structure and the thrust from the offset is transmitted through the shoulder 84 of the shaft 63. In this structure a single bearing is permitted to be large for supporting the weight directly under the wheel. However the small bearing and the large bearing are traced in triangular relation but permits the greater load to be transferred to the shaft at its larger diameter which creates less deflection.

Figure 4:
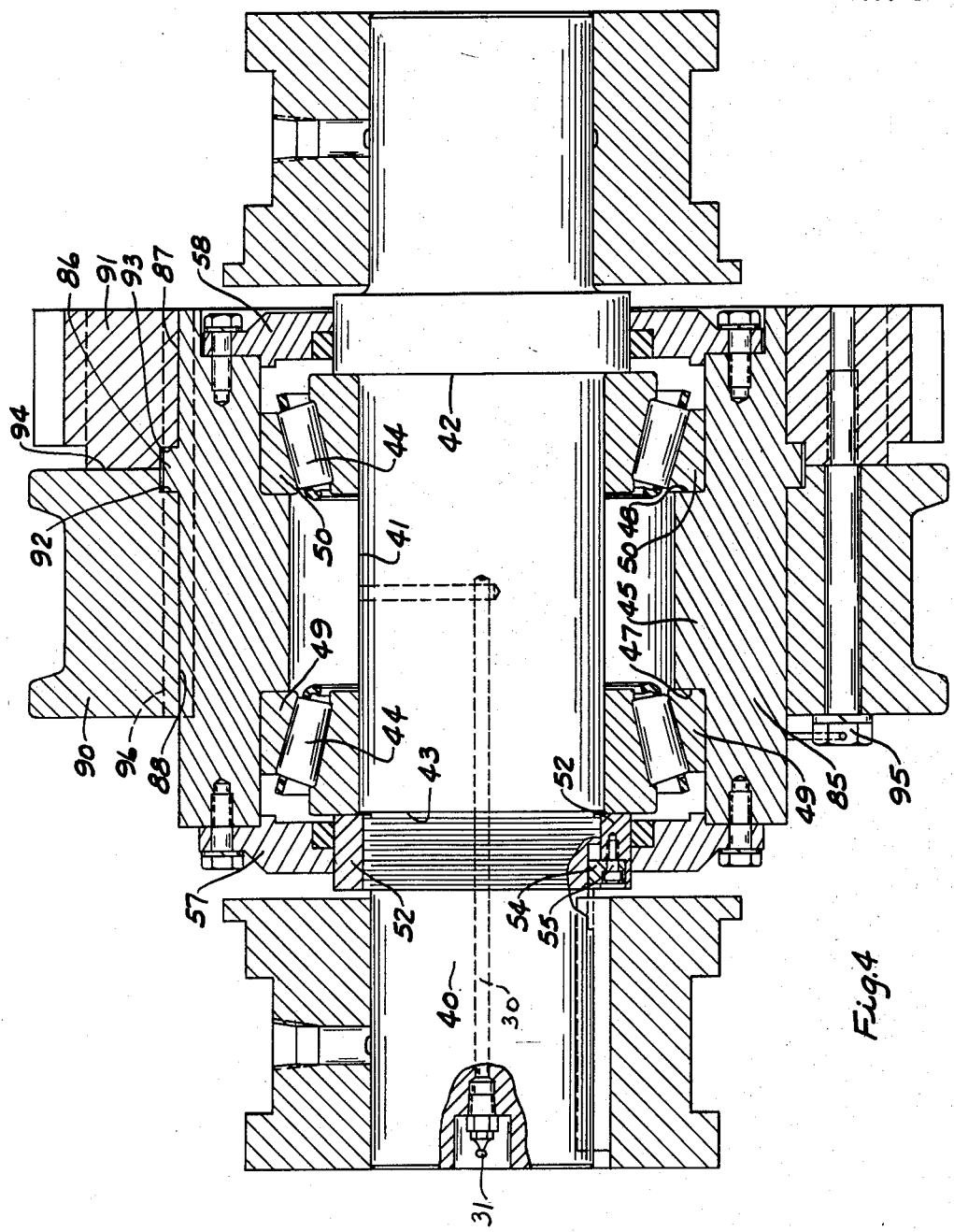
Fig. 4 is a sectional view of the crane wheel and bearing support disclosing a modified form of attaching the wheel to the bearing housing.

In the structure of Fig. 4 the bearing arrangement is the same as that shown in Fig. 2 wherein the shaft 40 has a central section 41 and a shoulder 42 will receive the bearings 44 which bearing arrangement is locked between the shoulders 47 and 48 of the flange 45 and the bearing housing 85. In the structure as shown in Fig. 4 the spacer ring 51 may be omitted and the bearing lock nut 52 directly engages the cone of the bearing 44. The perimeter of the bearing housing 85 is designed with a central radial flange 86 dividing the perimetral surfaces 87 and 88 on which the wheel 90 and the gear or blank 91 are given an interference fit. Both the wheel and the gear are provided with a shoulder as indicated at 92 and 93 respectively to engage the shoulders formed by the flange 86. However a clearance is provided between the wheel and the gear as indicated at 94 when the shoulders 92 and 93 engage the flange 86. This clearance may be taken up or partially taken up by the bolts 95 which pass through the wheel and into the gear or blank and thus bolt the two members together and cause them to be locked together on the bearing housing. The interference fit together with the bolts 95 are supplemented by the key 96. Thus neither of the rings 57 or 58 are employed to hold or function as an extra lock insofar as the wheel and gear are concerned and the bearing structure being the same as shown in Fig. 2 providing a bearing support in triangulation that positions the point of load slightly beyond the perimeter of the wheel. The same is true insofar as the bearing structures of Figs. 3 and 1. In the latter the projection of the triangulation is from the bearing on the opposite side of the shaft.

This arrangement of the bearing parts defines a novel distribution of the load in soaking pit cranes, soaking pit covercranes and ordinary lift cranes and floor charging support wheels. In the ordinary bridge type of cranes the long girder members are originally bowed upwardly and they present a stronger member when given this shape. However through long use and the daily lifting of heavy loads the body or seat in these girders changes and they become flat or even bowed in the opposite direction. During the transition of the condition on heavy crane structures the bearings for the wheels became misaligned particularly when they were opposite relative to the center of the wheel. This misalignment of the bearings would wear them out and also wear the wheels out. In the bearing mounting of this invention the triangulation of the distribution of the bearing load is within the wheel and is not opposite as in the prior art. Whereas in the former structures any misalignment of the blocks which embrace the ends of the shaft is not serious to the operation of the antifriction bearings as the triangulation of the load distribution is such that the shaft may have a tendency to tilt but this tilting functions through the bearing mounting to apply the load through the wheel without undue wear on the wheel or its bearing structures.

These undue strains set up through continued use of cranes in transporting heavy loads together with the torsional lock system on the wheels of the bearing assembly function to provide an improved life over that of the former structures.

Again when the wheel member and the gear or blank are separate structures from that of the bearing housing each of these members may be heat treated in a manner suited for their purpose and when combined and joined to form an integral structure will function to provide a better result than that when the wheel and the bearing housing are made in one solid piece with the gear bolted thereto, which prevents one from providing as good a heat treatment in accordance with the services it is to provide.

In the structure of Fig. 1 any lateral force from the body of the movably supported carriage is transmitted directly through the shaft and thence the bearings to the retainer plates and the wheel lips. In the structures of Figs. 2 to 4 the lateral forces are applied directly to and through the lock nuts or by their corresponding shaft shoulder at the other end of the assembly, and through the bearings and housing to the lip of the wheel. The lock nut threads assume no load whatever. An extension of the resultant force load vectors in transmitting combined lateral and vertical loads through the tapered roller bearings preferably cause them to cross one another beyond the actual tread of the wheel. These extended vectors shift laterally in accordance with the lateral and vertical load transmitted through bearings.

In each of the bearing structures of Figs. 1 to 4 the large capacity antifriction bearing is well within the dimensions of the wheels supported and do not extend the length of the shafts or increase the spacing between the brackets of the carriage. The stationary shafts of these structures permit greater strength in the brackets of the carriages since they do not of themselves require rotary bearing surfaces or blocks where they are attached to the carriage brackets. In Figs. 1 and 4 the brackets of the carriages carry replacement blocks on the shaft ends to avoid expensive replacement wheel assemblies for old carriage equipment. If these were new carriages these blocks would be eliminated entirely, which advantage is due to the wheel assemblies shown.

I claim:

1. A crane wheel support consisting of a tubular housing member having a crane wheel mounted thereon, a carriage, a nonrotary shaft member extending through said housing member, means to support said carriage from each end of said shaft member, a plurality of pairs of thrust transmitting means with a first pair on said housing member and a second pair on said shaft member, the first pair of said thrust transmitting means having thrust abutment surfaces faced outwardly from each other and carried by one of said members and the second pair of thrust transmitting means having abutment surfaces facing each other and carried by the other of said members to cooperate with the abutment surfaces of said first thrust transmitting means, antifriction bearing assemblies having inner and outer races held between the abutment surfaces of said first and second pairs of thrust transmitting mean, at least one of said thrust transmitting means including a demountable means, a fastening means securing said demountable means to its corresponding member, said demountable means carrying one abutment surface of its thrust transmitting means, and a third pair of thrust transmitting means embodying abutment surfaces on one of said members including said demountable means having direct contact with said carriage to bypass the lateral thrust forces from said fastening means.

2. The structure of claim 1 which also includes a radial flange on said housing member with said crane wheel engaging the same, a blank on said housing engaging said crane wheel, and bolt means securing the blank and said crane wheel in position on said housing.

3. The structure of claim 2 which also includes a key, locking the blank and said crane wheel to said housing member, and said bolt means including a plate bolted to said housing member and said plate overlapping said key.

4. The structure of claim 1 characterized in that said one member is said housing member and said other member is said shaft member, and said demountable means carrying one of said thrust transmitting means of said housing member is a plate bolted to the end of said housing member.

5. The structure of claim 4 characterized in that said plate overlaps the crane wheel on said housing member to aid in holding said crane wheel in place.

6. The structure of claim 4 which also includes a key between said crane wheel and said housing member, and said plate overlaps the crane wheel and key on said housing member to aid in holding them in place.

7. The structure of claim 4 characterized in that said housing member has an external shoulder against which said crane wheel is gauged.

8. The structure of claim 1 characterized in that said one member is said shaft member and said other member is said housing member and said demountable means carrying one of the thrust transmitting means of said shaft member is a nut and said fastening means securing it to said shaft is a thread.

9. The structure of claim 8 which also includes plates bolted on the ends of said housing member with clearance to said shaft member and at least one of said plates overlaps said crane wheel on said housing member to aid in holding said crane wheel in place and seal means carried by said plates and cooperating with the structure of said shaft member, the structure of said shaft member including said demountable means against which a seal engages.

10. The structure of claim 9 which also includes a key between said crane wheel and said housing member and said one plate overlaps said key.

11. The structure of claim 9 characterized in that said housing member has an external shoulder against which said crane wheel is gauged.

12. The structure of claim 1 which also includes a shoulder on said housing member against which said crane wheel is gauged and a plate means bolted to said housing member and engaging said crane wheel to clamp the same against said gauging shoulder to hold the same in place.

13. The structure of claim 1 characterized in that one bearing assembly is larger than the other and is positioned in the crane wheel to assume the greatest part of the load.

14. The structure of claim 1 which also includes a radial flange on said housing member with the crane wheel on one side and a blank on the other side providing a space therebetween and bolt means securing the crane wheel and the blank together.

15. The structure of claim 14 which also includes a key locking the blank and crane wheel to said housing member and plate means bolted to said housing member and overlapping said key.

16. The structure of claim 1 which also includes plates bolted on the ends of said housing member with clearance to said shaft and seal means carried by said plates and cooperating with the structure on said shaft member.

References Cited in the file of this patent
UNITED STATES PATENTS

| | | |
|---|---|---|
| 849,488 | Morse | Apr. 9, 1907 |
| 1,071,000 | Vandergrift | Aug. 19, 1913 |
| 1,194,917 | Wright | Aug. 15, 1916 |
| 1,437,833 | Buckwalter | Dec. 5, 1922 |
| 1,492,793 | Hansen | May 6, 1924 |
| 1,574,799 | Dierks | Mar. 2, 1926 |
| 1,583,785 | Evans | May 11, 1926 |
| 1,785,255 | Greve | Dec. 16, 1930 |
| 1,881,028 | Meyer | Oct. 4, 1932 |
| 2,032,490 | Moore | Mar. 3, 1936 |
| 2,052,524 | Baker | Aug. 25, 1936 |
| 2,346,950 | Strehlow | Apr. 18, 1944 |
| 2,711,936 | Rhine | June 28, 1955 |

FOREIGN PATENTS

| | | |
|---|---|---|
| 500,982 | Belgium | Apr. 25, 1952 |